US010528085B2

(12) United States Patent
Zhang et al.

(10) Patent No.: US 10,528,085 B2
(45) Date of Patent: Jan. 7, 2020

(54) PORTABLE ELECTRONIC DEVICE

(71) Applicants: Maintek Computer (Suzhou) Co., Ltd., JiangSu (CN); PEGATRON CORPORATION, Taipei (TW)

(72) Inventors: Bingyin Zhang, JiangSu (CN); Xuebing Cheng, JiangSu (CN); Chun-Yen Huang, JiangSu (CN)

(73) Assignees: Maintek Computer (Suzhou) Co., Ltd., Jiangsu (CN); Pegatron Corporation, Taipei (TW)

( * ) Notice: Subject to any disclaimer, the term of this patent is extended or adjusted under 35 U.S.C. 154(b) by 0 days.

(21) Appl. No.: 16/184,955

(22) Filed: Nov. 8, 2018

(65) Prior Publication Data

US 2019/0220063 A1    Jul. 18, 2019

(30) Foreign Application Priority Data

Jan. 15, 2018  (CN) .......................... 2018 1 0035285

(51) Int. Cl.
| | |
|---|---|
| *G06F 1/16* | (2006.01) |
| *H01R 33/74* | (2006.01) |
| *H01R 13/635* | (2006.01) |
| *H01R 13/631* | (2006.01) |
| *G06F 3/0354* | (2013.01) |
| *H01R 13/52* | (2006.01) |

(52) U.S. Cl.
CPC ............ *G06F 1/1656* (2013.01); *G06F 1/169* (2013.01); *G06F 1/1684* (2013.01); *G06F 3/03543* (2013.01); *G06F 3/03547* (2013.01); *H01R 13/5213* (2013.01); *H01R 13/631* (2013.01); *H01R 13/635* (2013.01); *H01R 33/74* (2013.01); *G06F 1/1616* (2013.01)

(58) Field of Classification Search
CPC ....... G06F 1/1656; G06F 1/169; G06F 1/1684
See application file for complete search history.

(56) References Cited

U.S. PATENT DOCUMENTS

| | | | | |
|---|---|---|---|---|
| 5,905,632 A | * | 5/1999 | Seto ...................... | G06F 1/1616 |
| | | | | 361/679.55 |
| 8,537,541 B2 | | 9/2013 | Zhang | |
| 8,693,179 B2 | | 4/2014 | Wei | |
| 2006/0050060 A1 | * | 3/2006 | Chang ................... | G06F 1/1616 |
| | | | | 345/173 |

(Continued)

FOREIGN PATENT DOCUMENTS

CN            202189304            4/2012

*Primary Examiner* — Nidhi Thaker
(74) *Attorney, Agent, or Firm* — J.C. Patents (57) ABSTRACT

The present invention provides a portable electronic device including a body, a first connector, a display screen, and an input module. The body has an accommodation space and a door panel capable of exposing or covering the accommodation space. The first connector is disposed in the accommodation space. The display screen is connected to the body and is capable of being closed or opened relative to the body. The input module is detachably accommodated in the accommodation space. The input module has a second connector. The second connector is configured to be electrically connected to the first connector. The input module operates in a first mode when being accommodated in the accommodation space. The input module operates in a second mode after being taken out from the accommodation space.

9 Claims, 11 Drawing Sheets (56) References Cited

U.S. PATENT DOCUMENTS

| | | | | |
|---|---|---|---|---|
| 2006/0152484 | A1* | 7/2006 | Rolus Borgward | G06F 1/1618 345/157 |
| 2010/0045604 | A1* | 2/2010 | Kim | G06F 1/1616 345/163 |
| 2010/0045606 | A1* | 2/2010 | Liu | G06F 1/1616 345/168 |
| 2013/0027864 | A1* | 1/2013 | Wei | G06F 1/169 361/679.08 |
| 2013/0039022 | A1* | 2/2013 | Wei | G06F 1/169 361/749 |
| 2013/0260822 | A1* | 10/2013 | Wu | G06F 1/1616 455/556.1 |

* cited by examiner

PORTABLE ELECTRONIC DEVICE

CROSS-REFERENCE TO RELATED APPLICATIONS

This Non-provisional application claims priority under 35 U.S.C. § 119(a) on Patent Application No(s). 201810035285.0 filed in People's Republic of China on Jan. 15, 2018, the entire contents of which are hereby incorporated by reference.

BACKGROUND

Technical Field

This present invention relates to an electronic device and more particularly, to a portable electronic device with ease of use.

Related Art

An input module of a common portable electronic device such as a notebook computer may include a key unit, a touchpad, and a mouse.

The key unit and the touchpad are built together with the body of the notebook computer. The key unit inputs text or instructions by means of keys. A user can use a finger to slide on or press the touchpad to control a cursor displayed on the screen of the notebook computer.

Because the operational flexibility of the touchpad is worse than that of the mouse and the user may unintentionally touch the touchpad during typing, many users prefer to use the mouse additionally. However, since the mouse is a device independent of the notebook computer, it is inconvenient for the user to carry the mouse.

SUMMARY

The present invention provides a portable electronic device with ease of use to improve the prior art.

According to the present invention, a portable electronic device includes a body, a first connector, a display screen, and an input module. The body has an accommodation space and a door panel capable of exposing or covering the accommodation space. The first connector is disposed in the accommodation space. The display screen is connected to the body and is capable of being closed or opened relative to the body. The input module is detachably accommodated in the accommodation space. The input module has a second connector configured to be electrically connected to the first connector. The input module operates in a first mode when being accommodated in the accommodation space. The input module operates in a second mode after being taken out from the accommodation space.

In an embodiment of the present invention, the door panel may slide relative to the accommodation space to expose or cover the accommodation space.

In an embodiment of the present invention, the body may have a yielding slot on a side of the accommodation space.

In an embodiment of the present invention, an upper surface of the door panel may be provided with a pulling bump.

In an embodiment of the present invention, a front end of the door panel may have an engaging tooth portion, the body may have an engaging groove portion at a side portion of the accommodation space, and the engaging tooth portion may be capable of being engaged with the engaging groove portion.

In an embodiment of the present invention, the first connector may have a plurality of first pins and the second connector may have a plurality of second pins.

In an embodiment of the present invention, the portable electronic device may further include an ejector member disposed in the body. The ejector member may have a first end portion and a second end portion. The first end portion may be exposed by the body and may be located outside the accommodation space, and the second end portion may be located inside the accommodation space. When the input module is accommodated in the accommodation space, the second end portion may eject the input module when the first end portion is pressed.

In an embodiment of the present invention, the ejector member may further have a pivot portion connected between the first end portion and the second end portion, and the first end portion and the second end portion may be capable of rotating about the pivot portion.

In an embodiment of the present invention, the first end portion, the pivot portion, and the second end portion may be integrally formed.

In an embodiment of the present invention, the portable electronic device may further include a button mounted on the first end portion.

In an embodiment of the present invention, the portable electronic device may further include a press block connected to an upper part of the second end portion.

Based on the above, the input module of the portable electronic device of the present invention can be detached from the body for use as a mouse, and therefore the user does not need to carry an extra mouse, thus providing convenience in use. In addition, after the user takes the input module out from the accommodation space, the door panel can cover the accommodation space to prevent entrance of foreign objects.

DETAILED DESCRIPTION

References will now be made in detail to exemplary embodiments of the present invention, and examples of the exemplary embodiments will be described in the accompanying drawings. Whenever possible, the same reference numerals are used in the drawings and descriptions to represent the same or similar parts.

Figure 1A:
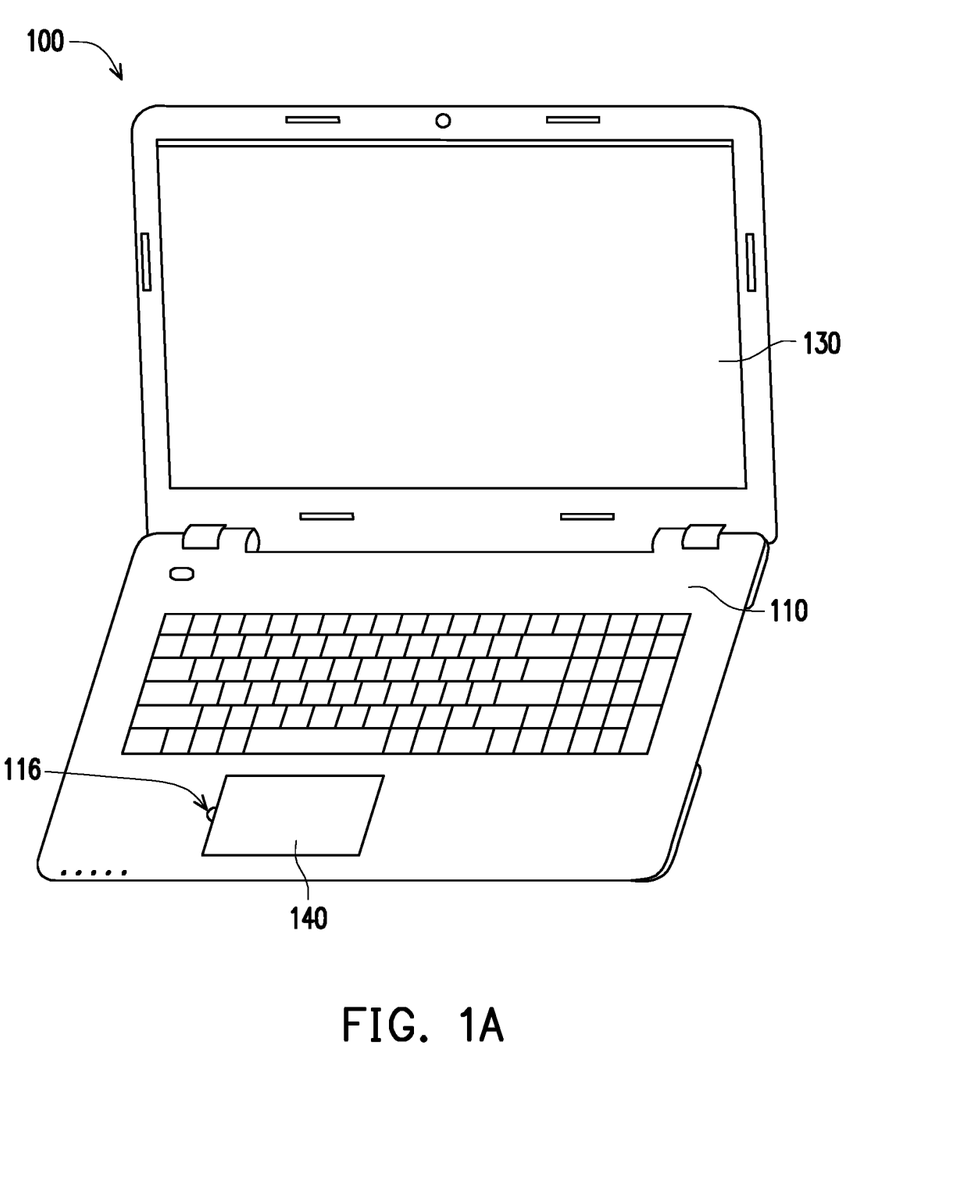
FIG. 1A is a schematic assembled view of a portable electronic device according to an embodiment of the present invention.
Figure 1B:
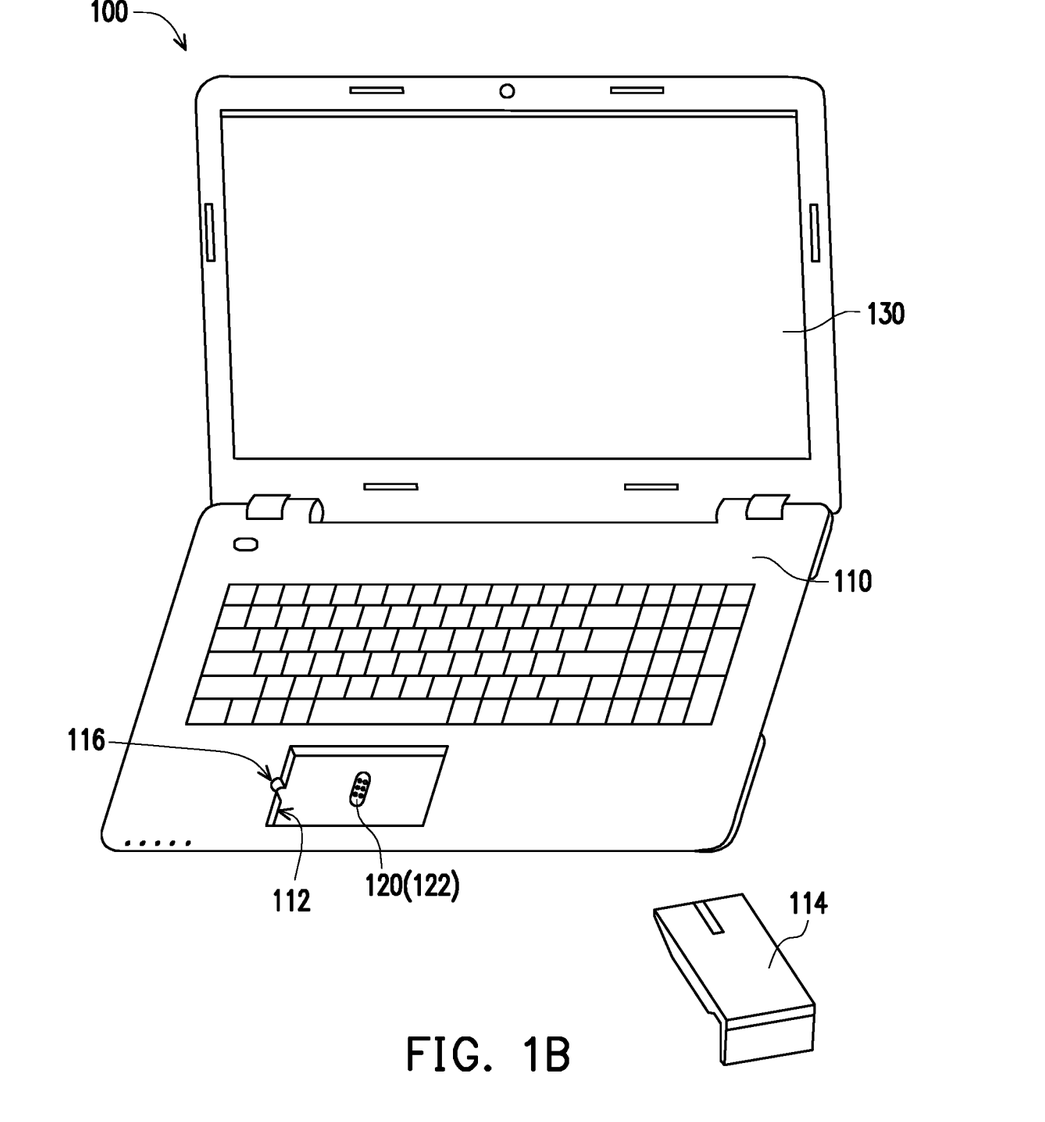
FIG. 1B is a schematic exploded view of the portable electronic device of FIG. 1A.
Figure 1C:
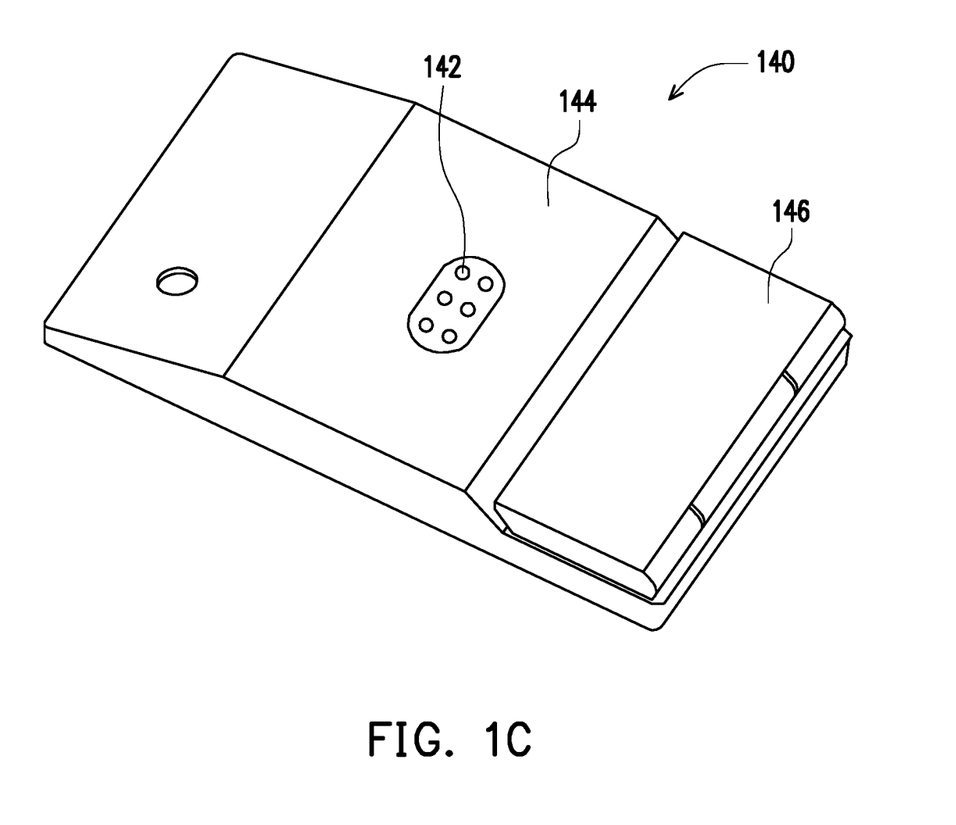
FIG. 1C is a schematic view of a bottom surface of an input module of FIG. 1B.

FIG. 1A is a schematic assembled view of a portable electronic device according to an embodiment of the present invention; FIG. 1B is a schematic exploded view of the portable electronic device of FIG. 1A; FIG. 1C is a schematic view of a bottom surface of an input module in FIG. 1B. The portable electronic device 100 includes a body 110, a first connector 120, a display screen 130, and an input module 140. The body 110 has an accommodation space 112 and a door panel 114 capable of exposing or covering the accommodation space 112 (referring to FIG. 2A). The first connector 120 is disposed in the accommodation space 112, and the first connector 120 has a plurality of first pins 122. The display screen 130 is connected to the body 110 and is adapted to be closed or opened relative to the body 110. The input module 140 is detachably accommodated in the accommodation space 112. The input module 140 has a second connector (not shown). The second connector has a plurality of second pins 142. The second connector is configured to be electrically connected to the first connector 120. The input module 140 operates in a first mode when being accommodated in the accommodation space 112. The input module 140 operates in a second mode after being taken out from the accommodation space 112.

Further, the body 110 includes a housing (not shown) and a keyboard module (not shown), and the input module 140 in this embodiment is a touchpad. The door panel 114 is configured to be capable of sliding relative to the accommodation space 112 to expose or cover the accommodation space 112. In this way, when the input module 140 is placed in the accommodation space 112, the door panel 114 can be concealed inside the housing of the body 110. However, the manner in which the door panel 114 is configured is not limited thereto. In other possible implementations, the door panel 114 may be capable of rotating relative to the housing of the body 110 by means of a rotating shaft to expose or cover the accommodation space 112. Alternatively, the door panel 114 may be made of a relatively soft material and can be rolled up to be received adjacent to the accommodation space 112. In addition, an adhesive layer may be provided at a lower part of a side edge of the door panel 114, so that the door panel 114 can be adhered to the housing of the body 110 by the adhesive layer.

As shown in FIG. 1A and FIG. 1B, a yielding slot 116 may be provided on a side of the accommodation space 112 of the body 110, so that a user can conveniently push the door panel 114 by means of the yielding slot 116. In addition, a pulling bump 118 (shown in FIG. 2A) may be provided on an upper surface of the door panel 114, so that the user can conveniently push the pulling bump 118 to slide the sliding door panel 114 to expose or cover the accommodation space 112. Either or both of the yielding slot 116 and the pulling bump 118 may be provided as required. Definitely, those skilled in the art can change the structure used for pushing or pulling the door panel 114 according to the material, the configuration, and the actuation manner of the door panel 114.

Figure 2A:
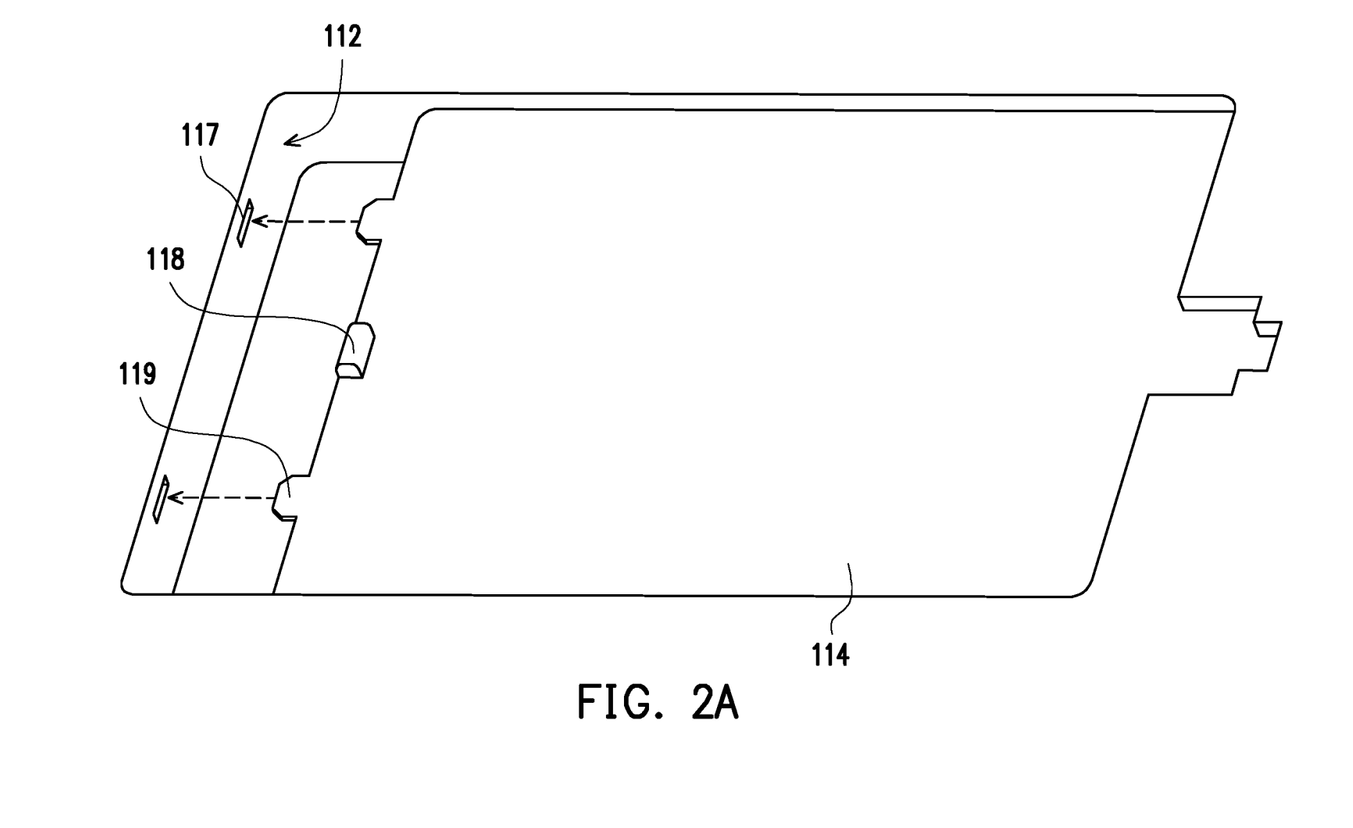
FIG. 2A is a schematic view of a door panel having an engaging tooth portion and a body having an engaging groove portion in the portable electronic device of FIG. 1A.
Figure 2B:
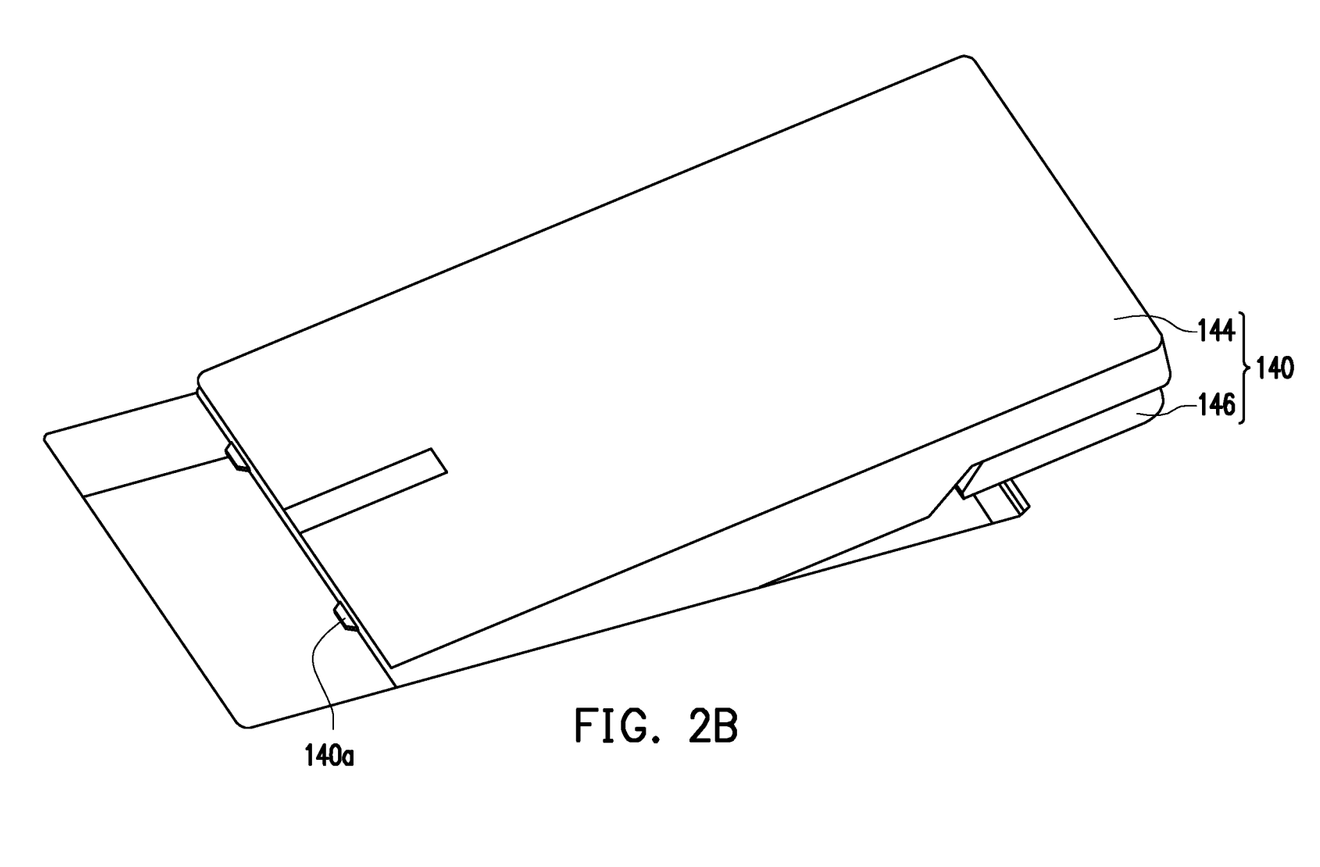
FIG. 2B is a schematic view of an input module having an engaging tooth portion in FIG. 1A.
Figure 2C:
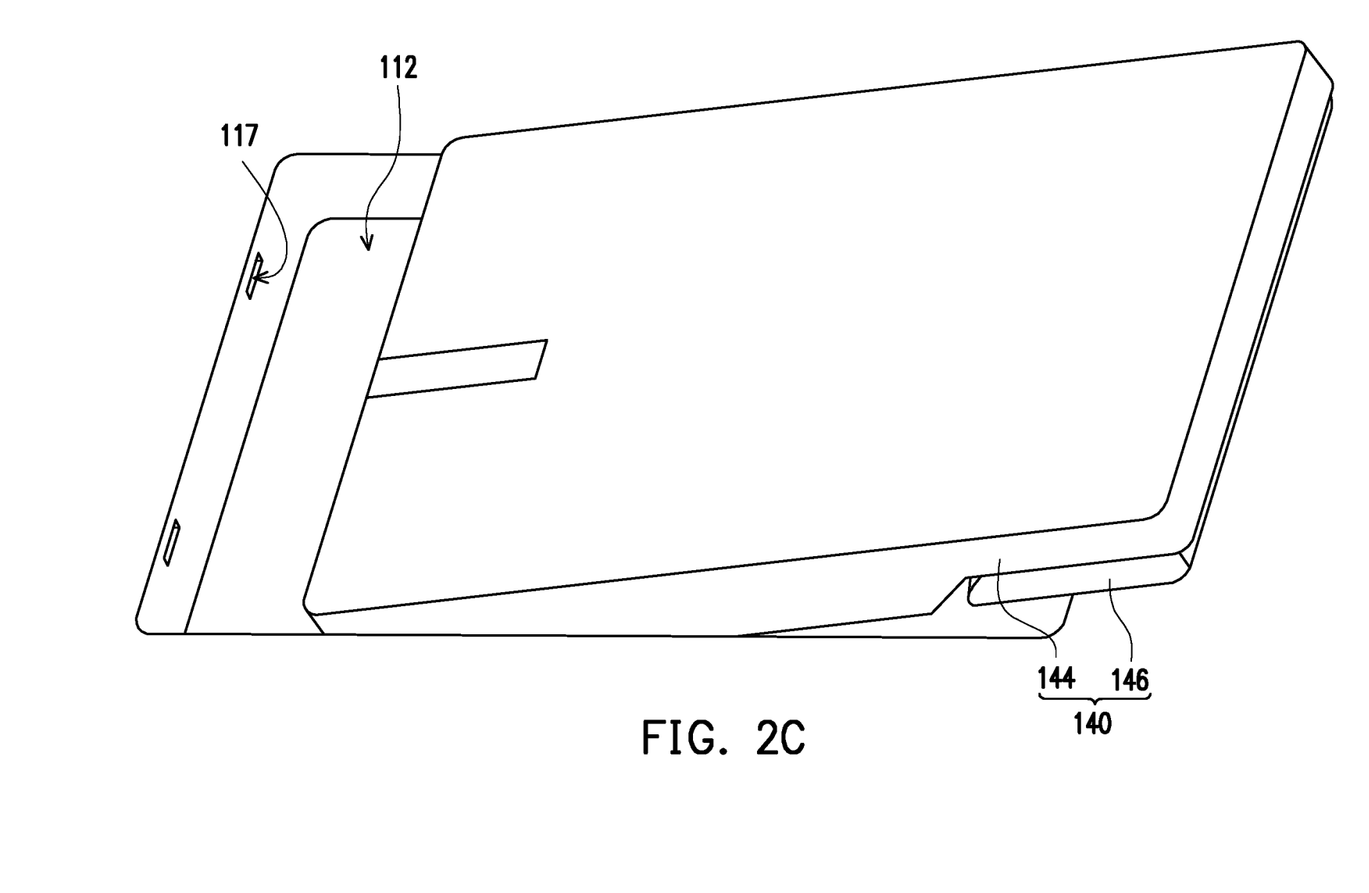
FIG. 2C is a schematic view of the body having the engaging groove portion in the portable electronic device of FIG. 1A.

Please refer to FIG. 2A, FIG. 2B, and FIG. 2C. An engaging tooth portion 119 may further be provided at a front end of the door panel 114, and the body 110 has an engaging groove portion 117 provided at a side portion of the accommodation space 112, so that when the door panel 114 covers the accommodation space 112, the door panel 114 can be fixed through engagement of the engaging tooth portion 119 and the engaging groove portion 117. Correspondingly, an engaging tooth portion 140a may also be provided on the input module 140 at a position corresponding to the engaging groove portion 117, so that the input module 140 can be mutually fixed to the body 110 through engagement of the engaging tooth portion 140a and the engaging groove portion 117. Definitely, the positions at which the engaging groove portion 117 and the engaging tooth portion 140a are provided can be interchanged with each other, or other structures can also be used for the purpose of positioning.

Figure 3:
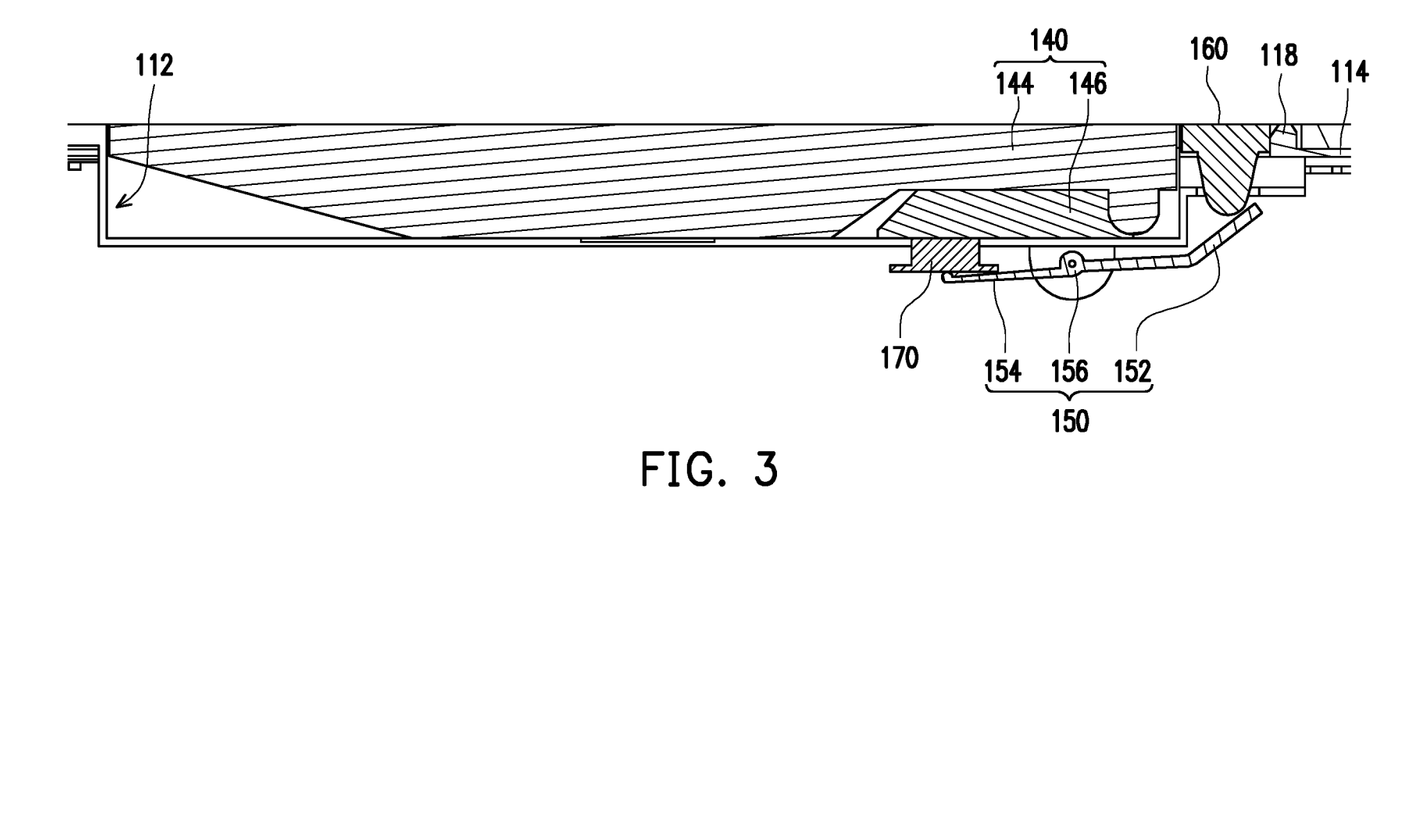
FIG. 3 is a partially cross-sectional view of the portable electronic device of FIG. 1A.
Figure 4:
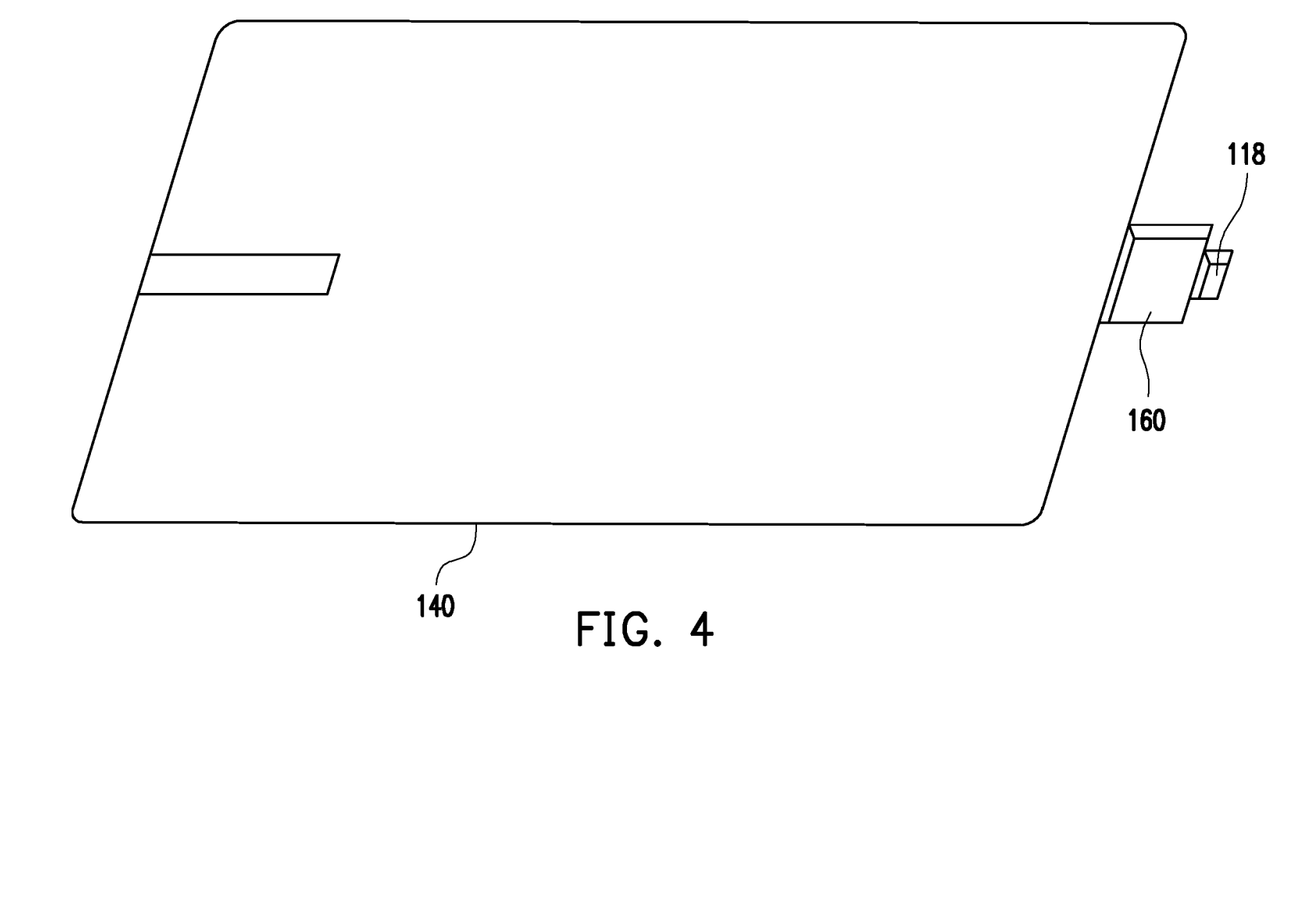
FIG. 4 is a partially enlarged view of the portable electronic device of FIG. 1A.

FIG. 3 is a partially cross-sectional view of the portable electronic device of FIG. 1A, and FIG. 4 is a partially enlarged view of the portable electronic device of FIG. 1A. Please refer to FIG. 1A, FIG. 3, and FIG. 4. In order to allow the user to conveniently take out the input module 140 from the accommodation space 112, the portable electronic device 100 may further include an ejector member 150 disposed in the body 110. The ejector member 150 has a first end portion 152, a second end portion 154, and a pivot portion 156 connected between the first end portion 152 and the second end portion 154. The first end portion 152 and the second end portion 154 are capable of rotating about the pivot portion 156.

The first end portion 152 may be exposed by the body 110 and located outside the accommodation space 112, and the second end portion 154 is located inside the accommodation space 112. By means of such a configuration, when the user presses the first end portion 152 of the ejector member 150 with a finger, the first end portion 152 and the second end portion 154 respectively moves downward and upward with the pivot portion 156 as a center of rotation to eject the input module 140 out of the accommodation space 112. Disposing the first end portion 152 outside the accommodation space 112 can prevent the input module 140 from blocking the first end portion 152 and making the user unable to press the first end portion 152 of the ejector member 150 with a finger when the input module 140 is received in the accommodation space 112.

The first end portion 152, the pivot portion 156, and the second end portion 154 may be integrally formed. Alternatively, separate components may be combined together by soldering, adhesion, or other possible means to form an ejector member 150.

In addition, the portable electronic device 100 may further include a button 160 mounted on the first end portion 152. The area of the button 160 is larger than that of the first end portion 152, allowing the user to conveniently press the button 160. Alternatively, the first end portion 152 may be configured into a shape of the button 160 as required.

The portable electronic device 100 may further include a press block 170 connected to an upper part of the second end portion 154. The configuration of the press block 170 can better fill a clearance between the second end portion 154 and the input module 140, so that the user can achieve desirable ejection efficiency by applying a small force to the first end portion 152. In addition, the press block 170 may be made of a relatively soft material to prevent damage to the input module 140 when the press block 170 enters into contact with the input module 140 to eject the input module 140.

Please refer to FIG. 1A to FIG. 1C. When using the portable electronic device 100 of the embodiments of the present invention, the user opens the display screen 130 relative to the body 110. In this case, the input module 140 is received in the accommodation space 112 of the body 110, and the door panel 114 is retracted into the housing (not shown) of the body 110. In this case, the second pins 142 of the second connector of the input module 140 are in contact with the first pins 122 of the first connector 120 located inside the accommodation space 112, so that the input module 140 is electrically connected to the body 110, and the user can operate the input module 140 as a touchpad. Meanwhile, the input module 140 can be charged as the second pins 142 are in contact with the first pins 122.

Figure 5:
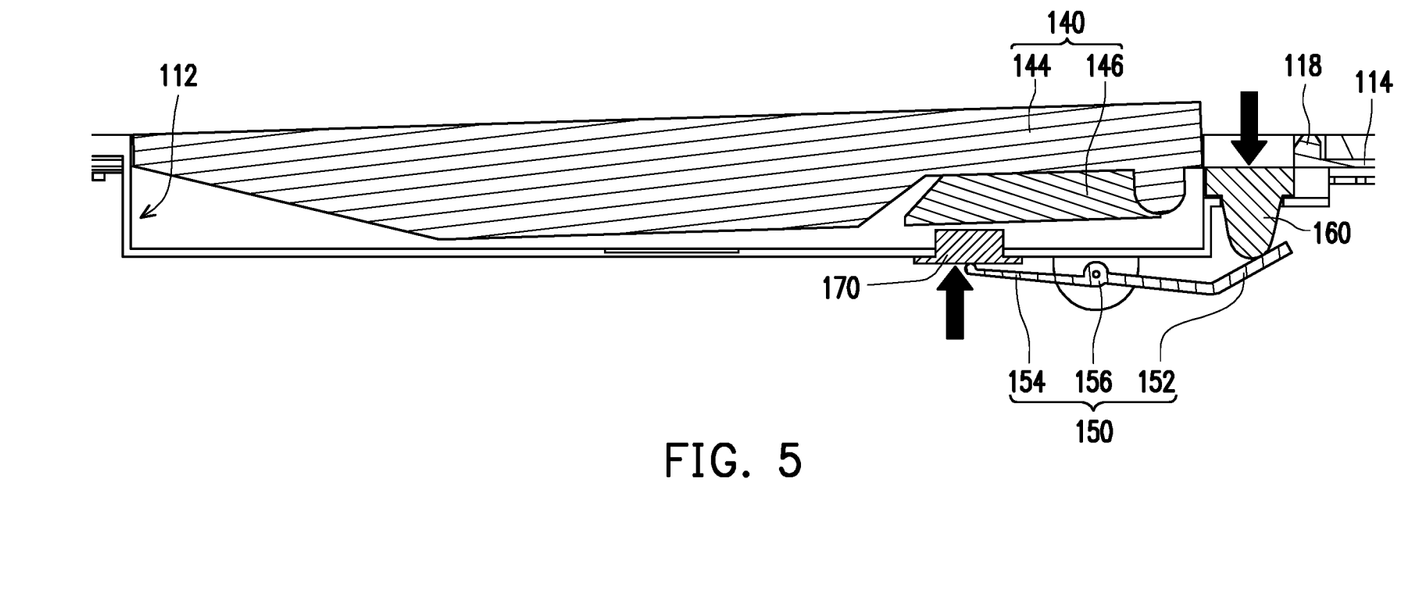
FIG. 5 is a schematic view of an operation of pressing a button to eject an input module.
Figure 6:
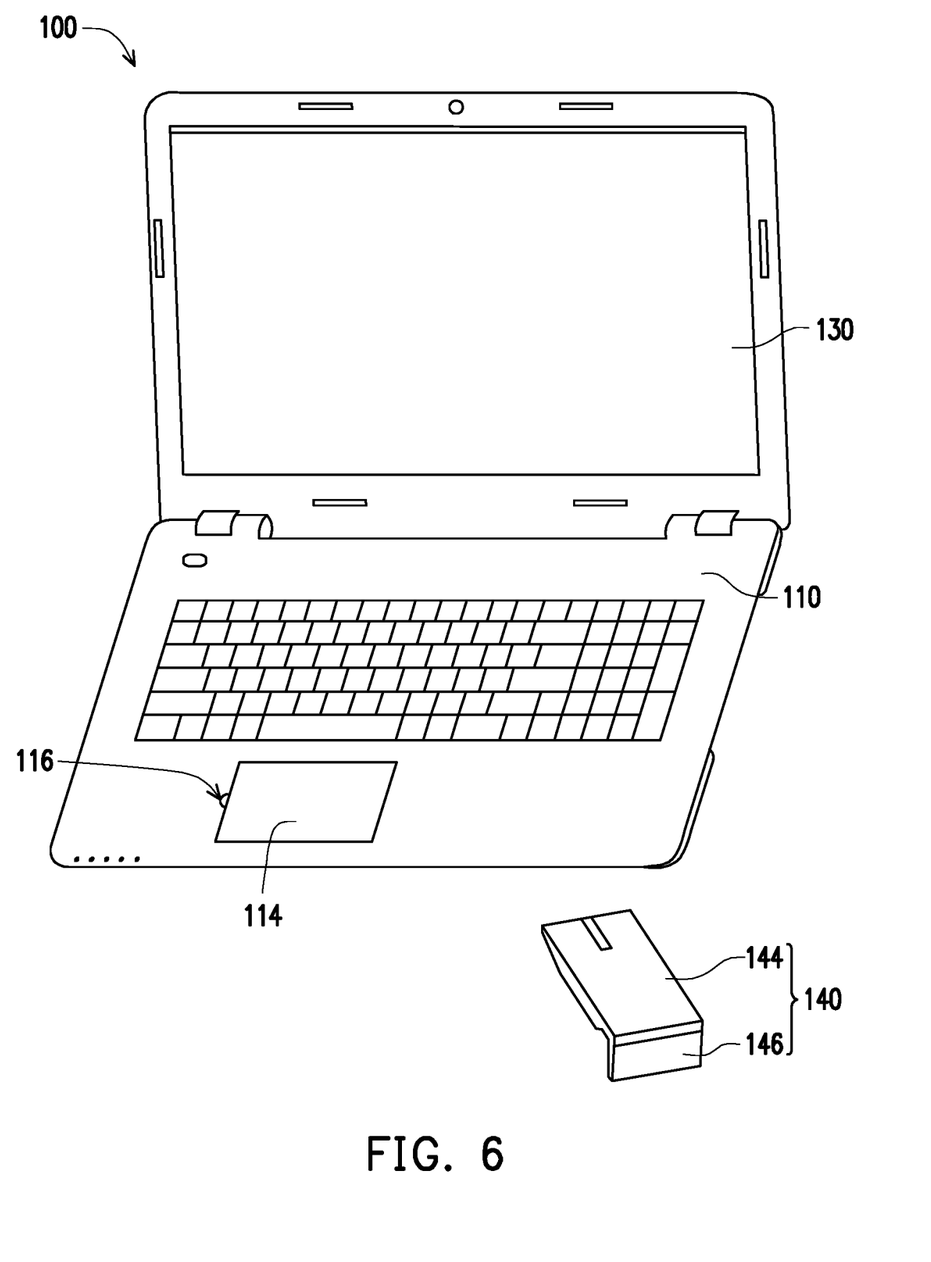
FIG. 6 is a schematic view of operating an input module in a mouse mode.

Further please refer to FIG. 1A, FIG. 3 and FIG. 5. If the user feels that it is inconvenient to use the input module 140 as a touchpad, the user may apply a force to press the button 160 mounted on the first end portion 152 to allow the first end portion 152 to rotate about the pivot portion 156 to drive the second end portion 154 to push the press block 170 upwards, so that the input module 140 is ejected out of the accommodation space 112 and protrudes out of a top surface of the housing of the body 110. In this case, the user can conveniently take out the input module 140 from the accommodation space 112 and use the input module 140 as a mouse (as shown in FIG. 6). After the input module 140 is taken out from the accommodation space 112 of the body 110, the input module 140 and the body 110 may be electrically connected with each other via Bluetooth or WiFi, so that the user can operate the input module 140 to move a cursor displayed on the display screen 130 or to execute a program. It should be noted that because the key configuration of a mouse is different from that of a touchpad module but can be adaptively changed through programming, the key configuration may be automatically changed by electronic control or mechanical means or manually changed so as to meet the user's use requirements.

In particular, after the user takes out the input module 140 from the accommodation space 112, the user may push the pulling bump 118 to cause the door panel 114 to slide out of the body 110, and cause the engaging tooth portion 119 at the front end of the door panel 114 to be engaged with the engaging groove portion 117 to fix the door panel 114, thereby covering the accommodation space 112 (as shown in FIG. 2A). The use of the door panel 114 to cover the accommodation space 112 (as shown in FIG. 6) not only can prevent the entrance of foreign objects into the accommodation space 112, but also can prevent exposure of the accommodation space 112 and provide the body 100 with a consistent appearance when the user uses the portable electronic device 100.

Further, the shape of the input module 140 may be designed to be similar to that of a mouse, or the shape of the input module 140 may be made to be similar to that of a mouse by changing the structure of the input module 140 after being taken out. As shown in FIG. 6, the input module 140 may have a touch portion 144 and a foldable portion 146. The foldable portion 146 may normally be folded up and received relative to the touch portion 144. When the input module 140 is used as a mouse, the foldable portion 146 can be unfolded relative to the touch portion 144, so that the input module 140 presents an arc shape for ease of use by the user.

Figure 7:
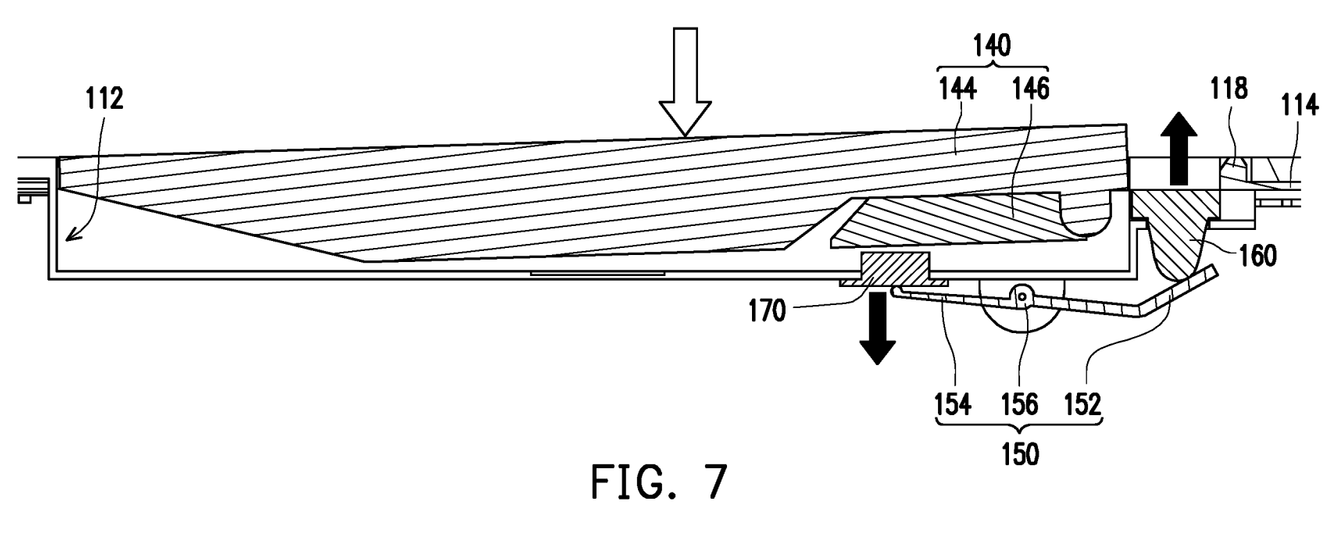
FIG. 7 is a schematic view of an operation of putting an input module back into an accommodation space.

Please refer to FIG. 6 and FIG. 7. When the input module 140 needs to be put back into the accommodation space 112 of the body 110, the foldable portion 146 of the input module 140 may be folded back to approach the touch portion 144, and then the input module 140 is put back into the accommodation space 112. In particular, first, the engaging tooth portion 140a at the front end of the input module 140 may be aligned with the engaging groove portion 117 at the side portion of the accommodation space 112, and then the input module 140 is pressed into the accommodation space 112. In this case, the input module 140 presses down the press block 170 to drive the second end portion 154 of the ejector member 150 to move downward, and the second end portion 154 drives the first end portion 152 to move upwards by means of the pivoting portion 156 that serves as the center of rotation, so that the button 160 mounted on the first end portion 152 is automatically raised.

To sum up, the portable electronic device of the embodiments of the present invention has at least the following advantages:

1. The input module is designed to be detachable from the accommodation space of the body. When the input module is assembled with the body and operates in the touchpad mode, the input module can be electrically connected to the body by means of contact surfaces of the pins. When the input module is detached from the body and operates in the mouse mode, the input module can be electrically connected to the body via Bluetooth or WiFi to operate a cursor displayed on the display screen or to execute a program.

2. The input module has the foldable portion, so that when the input module is detached from the body and operates in the mouse mode, the foldable portion can be unfolded to allow the input module to present an arc shape to adapt to the user's operation gestures.

3. After the input module is taken out from the accommodation space, the door panel can cover the accommodation space to prevent exposure of the accommodation space and provide the body with a consistent appearance.

Finally, it should be noted that the foregoing embodiments are merely used for describing the technical solutions of the present invention, but are not intended to limit the present invention. Although the present invention is described in detail with reference to the foregoing embodiments, those of ordinary skill in the art should understand that they may still make modifications to the technical solutions set forth in the foregoing embodiments or make equivalent replacements to some or all of the technical features in the embodiments, as long as such modifications or replacements do not cause the essence of the corresponding technical solutions to depart from the scope of the technical solutions of the embodiments of the present invention.

What is claimed is:

1. A portable electronic device, comprising:
    a body having an accommodation space and a door panel capable of exposing or covering the accommodation space;
    a first connector disposed in the accommodation space;
    a display screen connected to the body and capable of being closed or opened relative to the body;
    an input module detachably accommodated in the accommodation space, wherein the input module has a second connector configured to be electrically connected to the first connector, and the input module operates in a first mode when being accommodated in the accommodation space, and the input module operates in a second mode after being taken out from the accommodation space; and an ejector member disposed in the body, wherein the ejector member has a first end portion, a second end portion, and a pivot portion connected between the first end portion and the second end portion, the first end portion and the second end portion are capable of rotating about the pivot portion, the first end portion is exposed by the body and is located outside the accommodation space, the second end portion is located inside the accommodation space, and when the input module is accommodated in the accommodation space, the second end portion ejects the input module when the first end portion is pressed.

2. The portable electronic device according to claim 1, wherein the door panel slides relative to the accommodation space to expose or cover the accommodation space.

3. The portable electronic device according to claim 1, wherein the body has a yielding slot on a side of the accommodation space.

4. The portable electronic device according to claim 1, wherein an upper surface of the door panel is provided with a pulling bump.

5. The portable electronic device according to claim 1, wherein a front end of the door panel has an engaging tooth portion, and the body has an engaging groove portion at a side portion of the accommodation space, and the engaging tooth portion is capable of being engaged with the engaging groove portion.

6. The portable electronic device according to claim 1, wherein the first connector has a plurality of first pins and the second connector has a plurality of second pins.

7. The portable electronic device according to claim 1, wherein the first end portion, the pivot portion, and the second end portion are integrally formed.

8. The portable electronic device according to claim 1, further comprising a button mounted on the first end portion.

9. The portable electronic device according to claim 1, further comprising a press block connected to an upper part of the second end portion.

* * * * *